United States Patent
Seo (10) Patent No.: US 7,119,842 B2
(45) Date of Patent: Oct. 10, 2006

(54) IMAGE CAPTURING DEVICE INCLUDING A SPECTRALLY-SELECTIVELY TRANSMISSIVE DIAPHRAGM

(75) Inventor: Shuzo Seo, Saitama (JP)

(73) Assignee: PENTAX Corporation, Tokyo (JP)

( * ) Notice: Subject to any disclaimer, the term of this patent is extended or adjusted under 35 U.S.C. 154(b) by 644 days.

(21) Appl. No.: 10/158,900

(22) Filed: Jun. 3, 2002

(65) Prior Publication Data
US 2002/0186976 A1    Dec. 12, 2002

(30) Foreign Application Priority Data
Jun. 8, 2001    (JP)    ............................ P2001-173878

(51) Int. Cl.
H04N 5/232    (2006.01)
H04N 5/222    (2006.01)
G03B 13/00    (2006.01)
G01C 3/08    (2006.01)

(52) U.S. Cl. ...................... 348/348; 348/370; 356/5.01

(58) Field of Classification Search ................ 348/362, 348/363, 364, 367, 222.1, 224.1, 225.1, 46, 348/135, 138, 42, 496, 348, 370; 356/5.01, 356/4.01, 5.03, 5.04; 396/120; 250/559.38; 382/154
See application file for complete search history.

(56) References Cited

U.S. PATENT DOCUMENTS

| | | | |
|---|---|---|---|
| 5,081,540 A * | 1/1992 | Dufresne et al. | 359/30 |
| 5,214,454 A * | 5/1993 | Sano | 351/206 |
| 6,421,123 B1 * | 7/2002 | Shiraishi | 356/399 |
| 6,424,392 B1 * | 7/2002 | Bawolek et al. | 349/106 |
| 6,509,973 B1 * | 1/2003 | Kiyoi et al. | 356/606 |
| 6,876,392 B1 * | 4/2005 | Uomori et al. | 348/348 |
| 2002/0030163 A1 * | 3/2002 | Zhang | 250/330 |
| 2003/0132384 A1 * | 7/2003 | Sugiyama et al. | 250/330 |
| 2004/0135084 A1 * | 7/2004 | Sting et al. | 250/339.07 |
| 2004/0186351 A1 * | 9/2004 | Imaizumi et al. | 600/160 |
| 2005/0012843 A1 * | 1/2005 | Kuwakino et al. | 348/335 |
| 2005/0077470 A1 * | 4/2005 | Tichit et al. | 250/341.8 |

FOREIGN PATENT DOCUMENTS

WO    97/01111    1/1997

OTHER PUBLICATIONS

Christie et al., "Design and Development of a Multi-Detecting Two-Dimensional Ranging Sensor", Measurement Science Technology vol. 6 (1995), pp. 1301-1308.

* cited by examiner

Primary Examiner—David Ometz
Assistant Examiner—Justin Misleh
(74) Attorney, Agent, or Firm—Greenblum & Bernstein, P.L.C.

(57) ABSTRACT

An image-capturing device includes a photographing lens, a first imaging device, a second imaging device and a diaphragm. The photographing lens forms subject images on the first and second imaging devices. The first imaging device receives light rays of the infrared spectrum through the photographing lens and captures a subject image formed by the infrared rays. The second imaging device receives light rays of the visible spectrum through the photographing lens and captures a subject image formed by the visible rays. The diaphragm is mounted in a photographing optical system which includes the photographing lens, and the diaphragm forms a first area and a second area. The first area transmits light rays of the infrared and visible spectrums. The second area selectively transmits light rays of either the infrared or the visible spectrum.

14 Claims, 9 Drawing Sheets

IMAGE CAPTURING DEVICE INCLUDING A SPECTRALLY-SELECTIVELY TRANSMISSIVE DIAPHRAGM

BACKGROUND OF THE INVENTION

1. Field of the Invention

The present invention relates to an image-capturing device and diaphragm mounted in a device.

2. Description of the Related Art

An example of an image-capturing device is an active-system three-dimensional image-capturing device. An active-system three-dimensional image-capturing device which detects the three-dimensional shape of a subject, is disclosed in "Measurement Science and Technology" (S. Christies et al., vol. 6, p.1301–1308, 1995) and in International Publication No. WO 97/01111. In "Measurement Science and Technology", a pulse modulated laser beam is divergently emitted to a measurement subject from a device and the reflected light from the subject is received by a two-dimensional CCD sensor to which an image-intensifier is attached, so that received light energy is converted to electric signals. The shutter operation is carried out with an image-intensifier which is controlled by a gate-pulse, and the gate-pulse is synchronized with the pulse radiation of the laser beam. According to the above construction of the device, the amount of light received during the exposure time at each pixel of the CCD relates to the distance between the pixel and the corresponding point on the subject, so that electric signals which correspond to the distance of the subject are obtained for each pixel of the CCD.

In International Publication No. WO 97/01111, a device divergently emits pulse modulated light, such as a laser beam, to a measurement subject and the reflected light is received at the two-dimensional CCD sensor which is assembled with a mechanical shutter or an electro-optical shutter formed by a liquid crystal display, so that received light energy is converted to electric signals. The shutter is controlled at a timing which is different from that of the laser emission and distance information of the measurement subject is obtained at each pixel of the CCD. Note that, signal charges obtained at each pixel of the CCD, which relate to the distance information, can be regarded as image signals. Therefore a set of image signals which corresponds to distance information or depth keying will be referred to as a three-dimensional image in the following. On the other hand, an image obtained by the CCD controlled in a normal video drive, an image which corresponds to visual information or chroma keying, will be referred to as a two-dimensional image.

A three-dimensional image of a subject is often used with a two-dimensional image of the subject which is taken from the same position. For example, a three-dimensional image can be utilized for background image processing of a two-dimensional image according to distance information or depth of the three-dimensional image. Further, the three-dimensional image can be used to calculate data for the three-dimensional shape of a subject and the two-dimensional image can be used for texture data of the three-dimensional data. In the above situation, it is preferable to capture a two-dimensional image and a three-dimensional image with the same photographing optical system. For example, a two-dimensional image and a three-dimensional image are sequentially taken by the same photographing optical system from the same position.

SUMMARY OF THE INVENTION

An object of the present invention is to provide an image-capturing device and a diaphragm that can capture subject images formed out of different spectrums by a single photographing optical system simultaneously at appropriate exposures. Particularly, an object of the present invention is to provide an image-capturing device that captures a two-dimensional image and a three-dimensional image of a subject by a single photographing optical system simultaneously at appropriate exposures.

According to the present invention, an image-capturing device is provided that comprises a photographing optical system, a first imaging device, a second imaging device, and a diaphragm.

The photographing optical system is used to form subject images. The first imaging device receives light rays of a first spectrum through the photographing optical system and captures one of the subject images formed by light rays of the first spectrum. The second imaging device receives light rays of a second spectrum through the photographing optical system and captures one of the subject images formed by light rays of the second spectrum. The diaphragm mounted in the photographing optical system forms a first area and a second area. The first area transmits light rays of the first spectrum and the second spectrum, and the second area selectively transmit light rays from either the first spectrum or second spectrum.

According to the present invention, a diaphragm is provided that comprises a first aperture stop, and a second aperture stop. The first aperture stop has an opening which corresponds to a first area. The first area transmits light rays of a first spectrum and a second spectrum. The second aperture stop has an opening which corresponds to the first area and a second area. The second area surrounds the first area and selectively transmits light rays of either the first or second spectrum.

According to the present invention, a diaphragm is further provided that comprises a first aperture stop and second aperture stop. The second aperture stop is comprised of material which shields light rays of a first spectrum. An opening of the first aperture stop can be varied to a size smaller than a size of an opening of the second aperture.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiments shown in the drawings.

Figure 1:
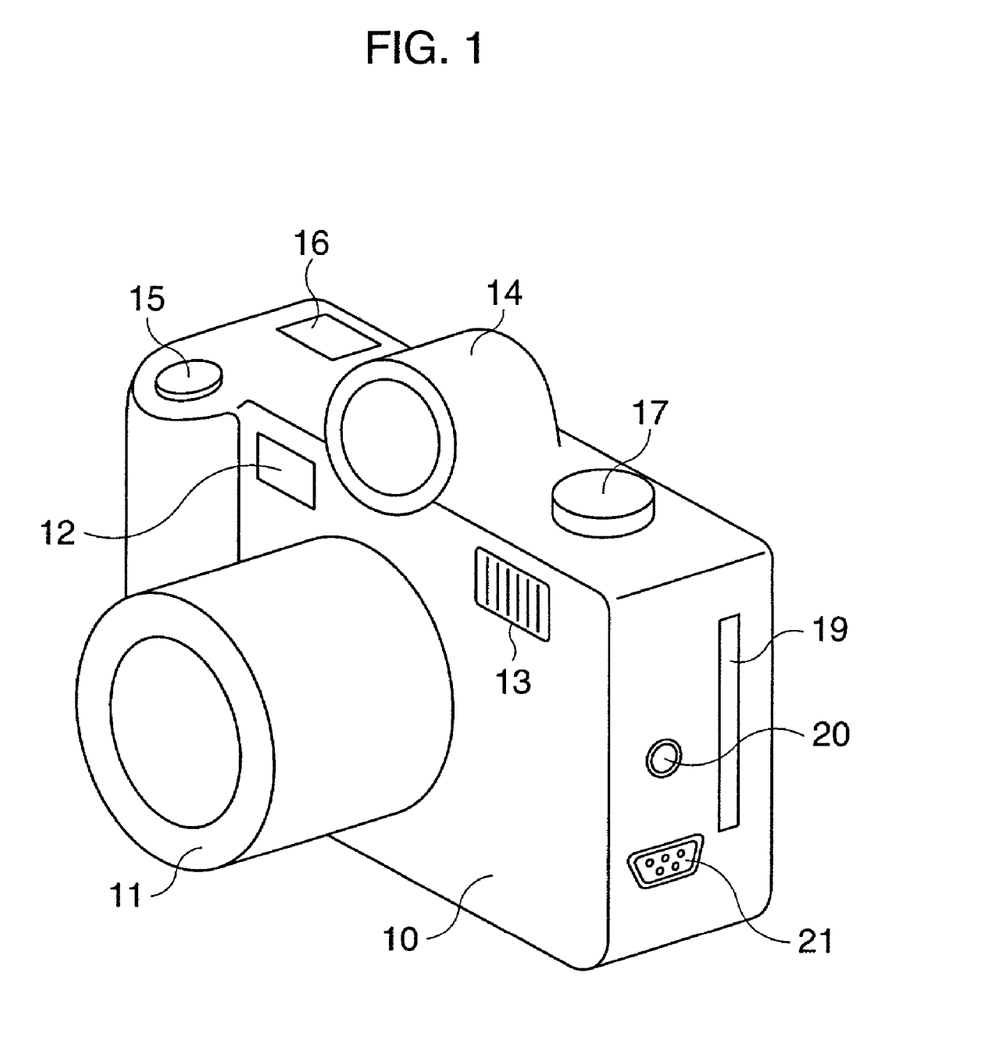
FIG. 1 is a perspective view showing a camera provided with a three-dimensional image-capturing device of the first and second embodiments of the present invention.

FIG. 1 is an external view of a camera-type three-dimensional device of a first embodiment of the present invention. With reference to FIG. 1, the three-dimensional device of the first embodiment is explained.

On the front surface of the camera body 10, a view-finder window (an objective side) 12 is provided toward the upper-left edge, adjacent to a photographing lens 11, and an electronic flash 13 is disposed toward the upper-right edge. A light-emitting device (light source) 14 which radiates laser beams for distance measurement is mounted on the upper surface of the camera body 10, above the photographing lens 11. A release switch 15 and a liquid crystal display panel 16 are provided on the left side of the light-emitting device 14, and a mode change dial 17 is provided on the right side of the device 14. On a side surface of the camera body 10, a card slot 19 is formed, into which a recording medium, such as an IC memory card, is insertable. A video output terminal 20 and an interface connector 21 are also provided on the side surface.

Figure 2:
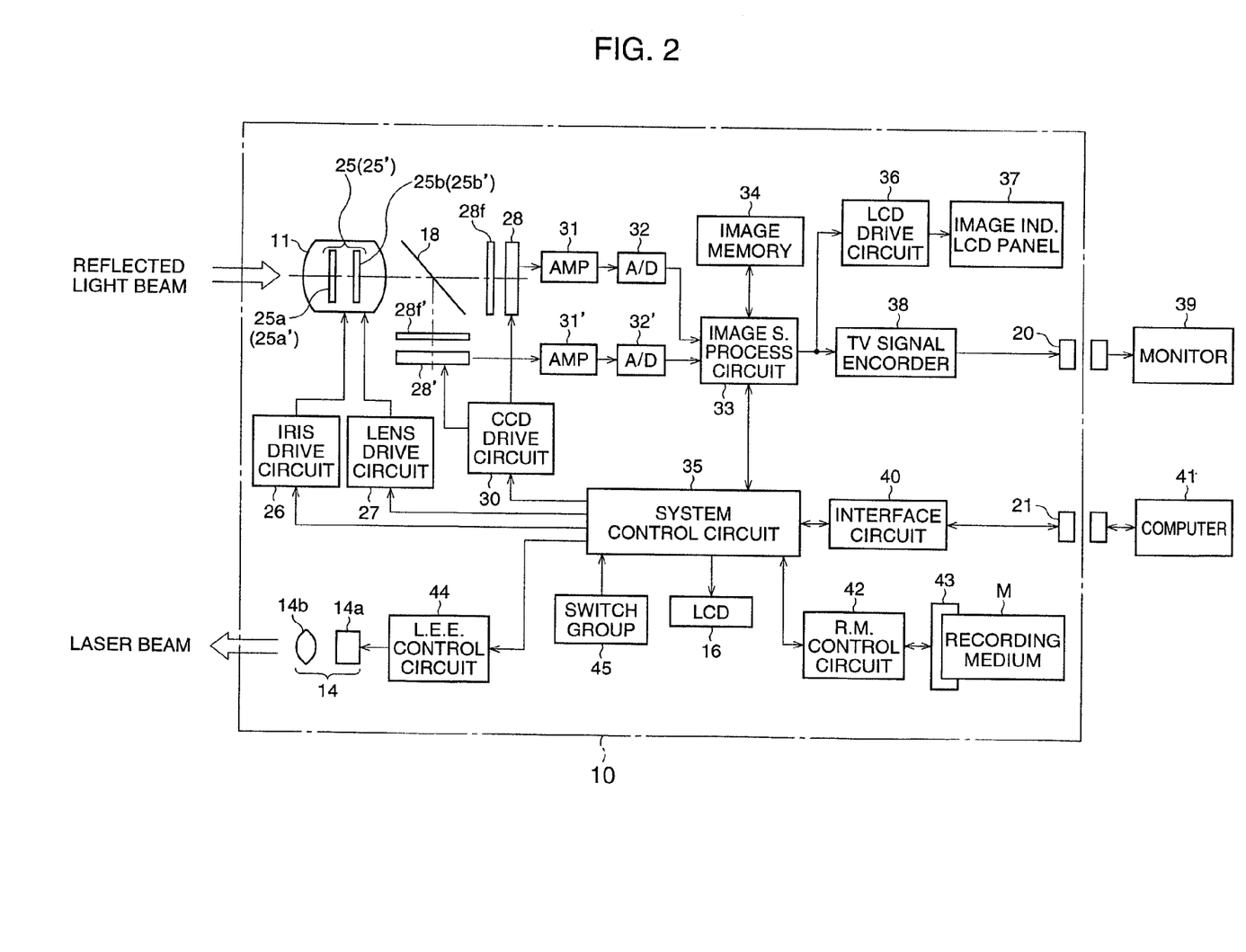
FIG. 2 is a block diagram showing an electrical construction of the camera shown in FIG. 1.

FIG. 2 is a block diagram showing an electrical construction of the camera of FIG. 1.

A diaphragm 25 is provided in the photographing lens 11. The diaphragm 25 is comprised of an aperture stop 25a and an aperture stop 25b. For example, the aperture stop 25a is a fixed stop (whose opening size is fixed) and the aperture stop 25b is an iris stop (whose opening size is variable). The opening degree of the iris stop 25b is adjusted by the iris drive circuit 26. A focusing operation and a zoom operation of the photographing lens 11 are controlled by the lens drive circuit 27. Note that, the structure of the diaphragm 25 will be detailed latter.

On the optical axis of the photographing lens 11, a dichroic mirror 18 that reflects the infrared light rays while transmitting the visible rays is provided. For example, a surface of the dichroic mirror 18 intersects with the optical axis at 45 degrees. The visible rays which are transmitted by the dichroic mirror 18 pass through an infrared cut-off filter 28f and reach a two-dimensional image-capturing CCD 28. A subject image of visible rays (which corresponds to a two-dimensional image) is formed on the imaging surface of the two-dimensional image-capturing CCD 28 by the photographing lens 11. An electric charge corresponding to a visible or chroma keying subject image is generated on the imaging surface of the two-dimensional image-capturing CCD 28. An operation, such as an accumulating operation and a reading operation of the electric charge of the two-dimensional image-capturing CCD 28, is controlled by CCD drive pulse signals fed from a system control circuit 35 to a CCD drive circuit 30. Electric charge signals from the two-dimensional image-capturing CCD 28, i.e., image signals for a two-dimensional image, are amplified by an amplifier 31, and are converted from analog signals to digital signals by an A/D converter 32. The digital image signals from the A/D converter 32 are subjected to processes, such as a gamma correction and so on, in an image-signal process circuit 33, and are temporally stored as digital image data in the image memory 34.

On the other hand, the infrared rays which have been reflected by the dichroic mirror 18 pass through a visible rays cut-off filter 28f′ and reach a three-dimensional image-capturing CCD 28′. The subject image of infrared rays (which corresponds to a three-dimensional image) is formed on the imaging surface of the three-dimensional image-capturing CCD 28′ by the photographing lens 11. An electric charge corresponding to an infrared subject image is generated on the imaging surface of the three-dimensional image-capturing CCD 28′. An operation, such as an accumulating operation and a reading operation of the electric charge of the three-dimensional image-capturing CCD 28′, is controlled by CCD drive pulse signals fed from the system control circuit 35 to the CCD drive circuit 30. Electric charge signals from the three-dimensional image-capturing CCD 28′, i.e., image signals for a three-dimensional image, are amplified by an amplifier 31′, and are converted from analog signals to digital signals by the A/D converter 32′. The digital image signals from the A/D converter 32′ are subjected to processes, such as a gamma correction and so on, in the image-signal process circuit 33, and are temporally stored as digital image data in the image memory 34.

The iris drive circuit 26, the lens drive circuit 27, and the image-signal process circuit 33 are controlled by the system control circuit 35. Image signals or digital image data of a two-dimensional image or three-dimensional image are read from the image memory 34 and supplied to an LCD drive circuit 36. The LCD drive circuit 36 is operated in accordance with the digital image data, so that an image corresponding to the digital image data is displayed on an image indicating LCD panel 37.

The digital image data read from the image memory 34 is also transmitted to a TV signal encoder 38, so that the digital image data can be transmitted to a monitor device 39, provided externally to the camera body 10, through a video output terminal 20. The system control circuit 35 is connected to an interface circuit 40 and the interface circuit 40 is connected to an interface connector 21. Therefore, digital image data of a two-dimensional or three-dimensional image which are read from the image memory 34 can also be transmitted to a computer 41 connected to the interface connector 21 via an interface cable. Further, the system control circuit 35 is connected to an image-recording device 43 through a recording medium control circuit 42. Therefore, digital image data of a two-dimensional or three-dimensional image which are read from the image memory 34 can be recorded in a recording medium M, such as an IC memory card, attached to the image recording device 43. Further, the image data recorded in the recording medium M may be displayed on the image indicating LCD panel 37 via the system control circuit 35 if required.

A light-emitting element control circuit 44 is connected to the system control circuit 35. The light-emitting device 14 is provided with a light-emitting element 14a and an illumination lens 14b. The operation of the light-emitting elements 14a is controlled by the light-emitting element control circuit 44. The light-emitting elements 14a radiate infrared laser beams in the spectrum between approximately 770 nm and 950 nm as distance-measurement light beams. The beams are diverged by the illumination lenses 14b, so that each diverged laser beam irradiates the entire measurement subject. The infrared laser beams reflected by the measurement subject become incident on the photographing lens 11 and the reflected laser beams are reflected by the dichroic mirror 18 to the three-dimensional image-capturing CCD 28', so that the light beams are detected on the three-dimensional image-capturing CCD 28' as image signals for a three-dimensional image of the subject. As will be discussed later, the distance from the camera 10 to the measuring subject that corresponds to each of the pixels in the three-dimensional image-capturing CCD 28' is obtained from the image signals detected at each pixel.

A switch group 45, including a release switch 15 and a mode change dial 17, and a liquid crystal display panel (indicating device) 16 are connected to the system control circuit 35.

Figure 3:
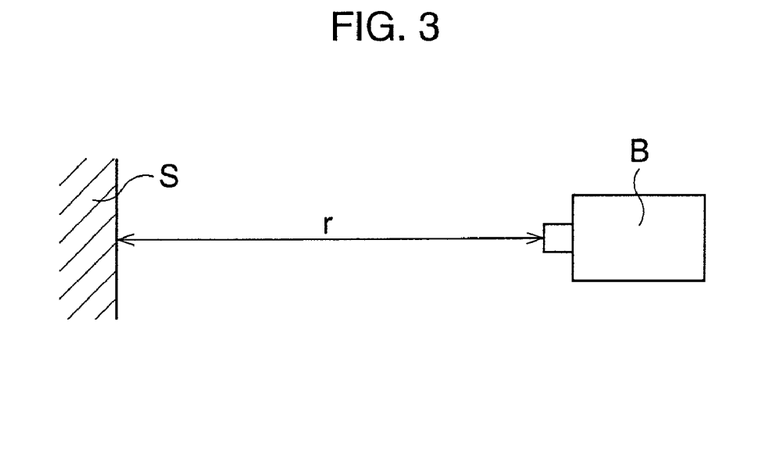
FIG. 3 is a view showing the principle behind distance measurement.
Figure 4:
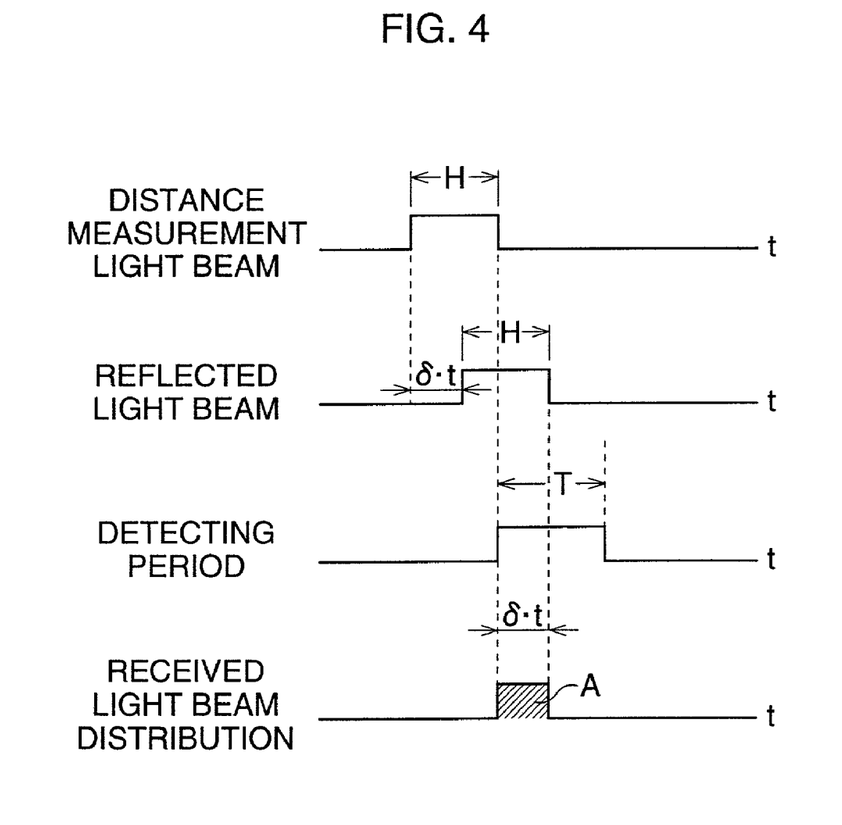
FIG. 4 is a timing chart showing a distance-measurement light beam, reflected light beam, a gate pulse, and the distribution of the accumulated amount of light received by a CCD.

With reference to FIGS. 3 and 4, the principle behind the distance measurement by a CCD in the embodiment will be described below. Note that, in FIG. 4, the abscissa indicates time "t".

A distance-measurement light beam output by the distance-measurement device B is reflected by the measurement subject S, and the reflected light beam is sensed by a CCD (not shown). The distance-measurement light beam is emitted as a pulse beam of width "H", so that the reflected light has the same pulse width "H". The leading edge of the pulse of the reflected light beam is delayed δ·t (δ is a delay coefficient) from the leading edge of the pulse of the distance-measurement light beam. Since the distance-measurement light beam and the reflected light beam have both traveled a distance "r" between the distance measurement device B and the measured subject S, the round trip distance "R" is represented as follows:

$$R = 2r = \delta \cdot t \cdot C \tag{1}$$

wherein "C" is the speed of light.

For example, the reflected light beam detecting period T is set in such a manner that the reflected light beam can only be sensed from the point when the pulse of the distance-measurement light beam falls to a point after the fall of the pulse of the reflected light beam. Namely, the reflected light beam detecting period T is set in order to receive the rise of the reflected light pulse at the CCD before the reflected light beam detecting period starts and to detect the fall in the reflected light beam detecting period. As shown in FIG. 4, an amount "A" of reflected light received during the reflected light beam detecting period T becomes a function of the distance "r". Namely, the greater the distance "r" (or the greater the time δ·t), the greater the received light amount "A", so that the distance "r" is derived from the amount "A".

In the present embodiment, by taking advantage of the principle described above, the distance information which represents the three-dimensional shape of a measurement subject S is obtained in accordance with the received light amount "A" sensed in each of the photo-diodes which are two-dimensionally disposed on the three-dimensional image-capturing CCD 28'. Namely, from the received light amount "A" detected in each of the photodiodes or pixels, the distance from the camera body 10 to each point on the surface of the measurement subject S is sensed as an image signal (a three-dimensional image) for each of the photo-diodes or pixels of the three-dimensional image-capturing CCD 28'. Consequently, the distance data representing the three-dimensional shape or the topography of the subject S is obtained from the image signals detected in the three-dimensional image-capturing CCD 28' for each of the photodiodes or pixels.

In the present embodiment, a CCD with an on-chip color filter is utilized for the two-dimensional image-capturing CCD 28 and a monochrome CCD for sensing the infrared rays is utilized for the three-dimensional image-capturing CCD 28'. Generally, the two-dimensional image-capturing CCD 28 and the three-dimensional image-capturing CCD 28' have the same basic structure, except for the color filters attached for capturing color images. Therefore, the structure of the CCD is only explained for the three-dimensional image-capturing CCD 28' with reference to FIG. 5 and FIG. 6, and the description of the two-dimensional image-capturing CCD 28 is omitted. However, the same is true for the two-dimensional image-capturing CCD 28 as for the three-dimensional image-capturing CCD 28'.

Figure 5:
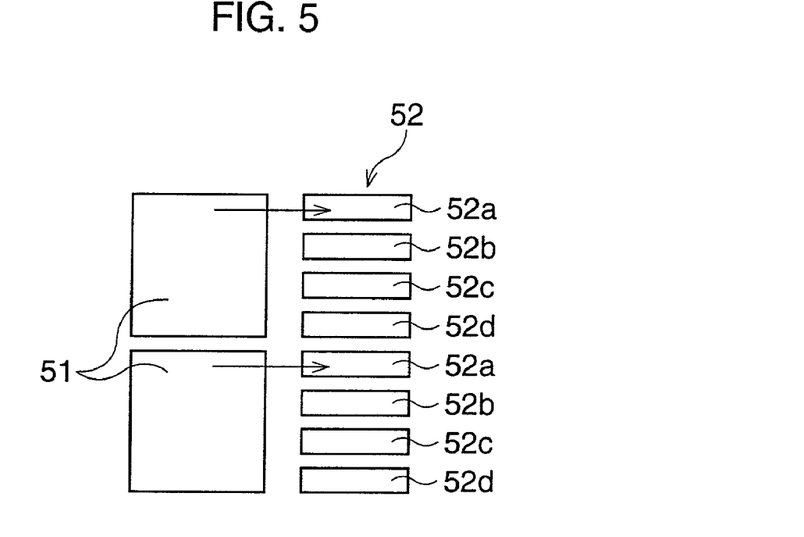
FIG. 5 is a plan view showing a disposition of the photo-diodes and vertical transfer unit, which are provided in the CCD.
Figure 6:
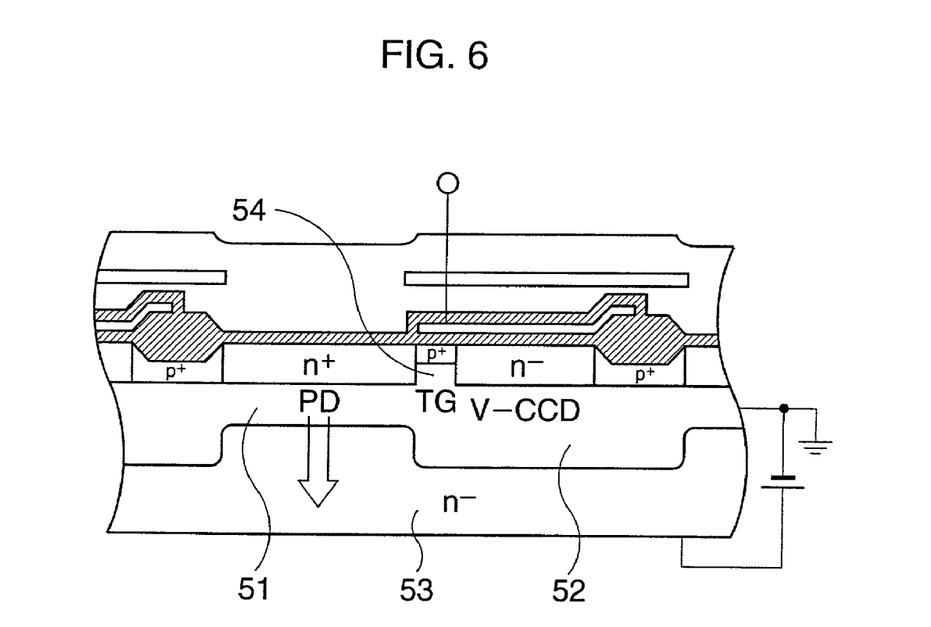
FIG. 6 is a sectioned elevational view of the CCD.

FIG. 5 is a plan view showing a disposition of photo-diodes 51 and a vertical transfer unit 52, which are provided in the three-dimensional image-capturing CCD 28'. Actually, a multitude of photo-diodes 51 are arranged in a matrix, and a corresponding vertical transfer unit 52 is disposed beside each vertical column of photo-diodes 51. FIG. 6 is a sectioned elevational view of the three-dimensional image-capturing CCD 28' in which the CCD 28' is cut by a plane perpendicular to a substrate 53. An example of the three-dimensional image-capturing CCD 28' is an interline CCD, a vertical overflow drain (VOD) type, in which unwanted charge is discharged to the substrate 53.

The photo-diodes 51 and the vertical transfer unit (signal charge holding unit) 52 are formed along a surface of the n-type substrate 53. A plurality of photo-diodes 51 are two-dimensionally disposed in a matrix arrangement, and the vertical transfer unit 52 is disposed adjacent to the photo-diodes 51, parallel to rows extending in a vertical direction in FIG. 5. The vertical transfer unit 52 has four vertical transfer electrodes 52a, 52b, 52c and 52d, which correspond to each of the photo-diodes 51. Therefore, in the vertical transfer unit 52, four potential wells can be formed, so that a signal charge is output from the three-dimensional image-capturing CCD 28' by controlling the depth of the wells, as is well known. Note that the number of the vertical transfer electrodes can be changed, depending upon the requirements for the CCD.

The photo-diodes (PD) 51 and the vertical transfer unit (signal charge holding unit) 52 are disposed in a p-type well formed on a surface of the substrate 53. The p-type well is completely depleted due to an inverse bias voltage applied between the p-type well and the n-type substrate 53. In this state, electric charge is accumulated in the photo-diodes 51, and the amount of the electric charge corresponds to the amount of incident light, which is the reflected light, reflected by the measurement subject. When a substrate voltage $V_{sub}$ is changed to a value greater than a predetermined value, electric charge accumulated in the photo-diodes 51 is discharged to the substrate 53. Conversely, when an electric charge transfer signal, which is a voltage signal, is applied to a transfer gate (TG) 54, the electric charge accumulated in the photo-diodes 51 is transferred to the vertical transfer unit 52. Namely, after the electric charge is discharged to the substrate 53 due to the electric charge discharging signal, the signal charge accumulated in the photo-diode 51 is transferred to the vertical transfer unit 52 due to the electric charge transfer signal. By repeating the discharge and the transfer, an electronic shuttering operation is performed.

When a two-dimensional image is captured by the two-dimensional image-capturing CCD 28, a sufficient output can be obtained by the above electronic shutter operation. However, the measurement of a measurement subject with the three-dimensional image-capturing CCD 28', which is based on the above principle described with reference to FIG. 3 and FIG. 4, requires an extremely high-speed shutter operation for capturing a three-dimensional image, so that an insufficient signal output is obtained in a single shutter operation. Therefore, in the distance-information sensing operation of the present embodiment, the above shutter operation may be repeated during one field period for a predetermined number of times in the three-dimensional image-capturing CCD 28', so that signal electrical charges are integrated in the vertical transfer unit 52 and a large signal output is obtainable.

Figure 7:
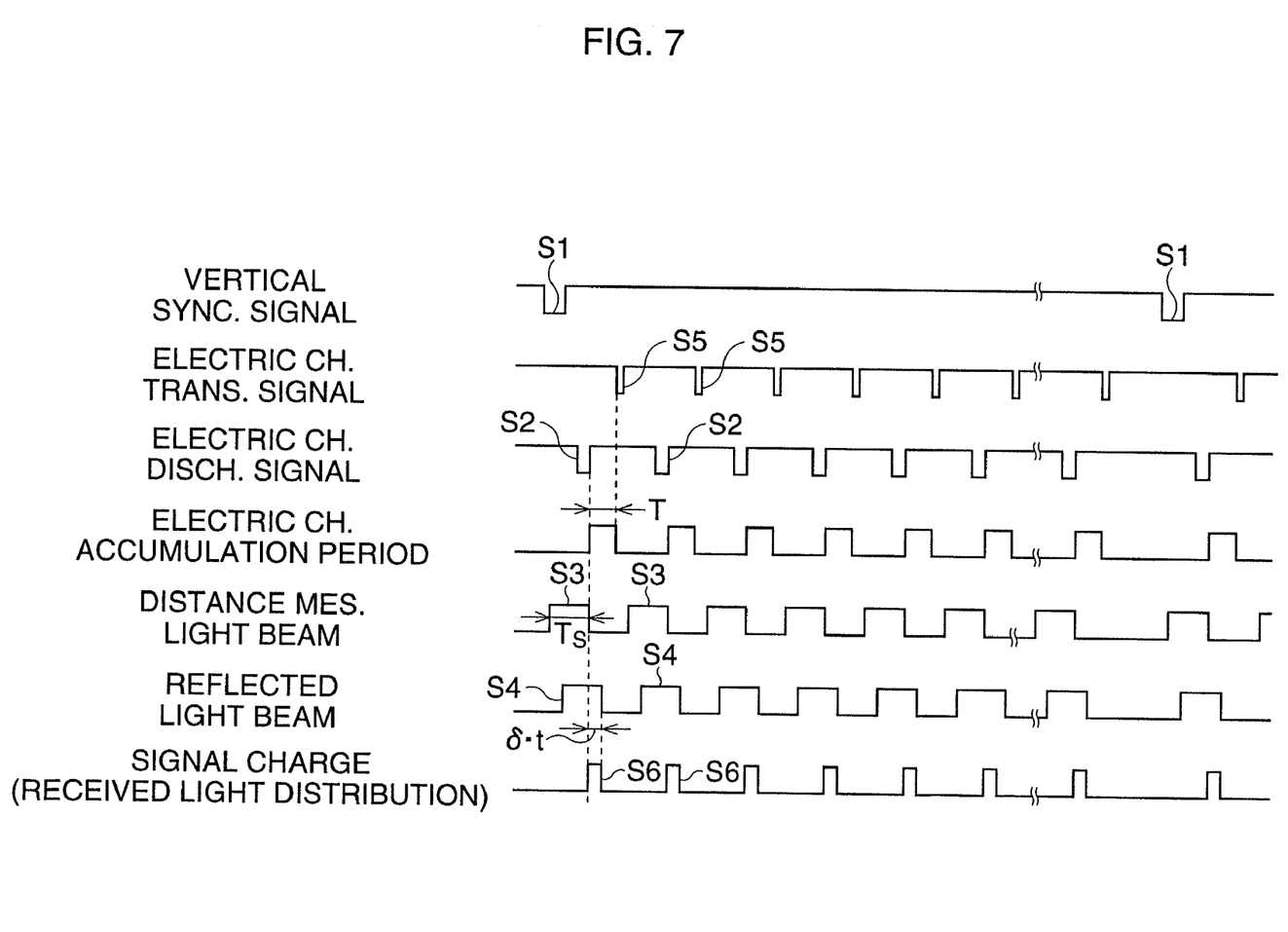
FIG. 7 is the timing chart for a distance-information sensing operation by which data, corresponding to the distance from the camera body to each point on the surface of a measurement subject, is sensed.
Figure 8:
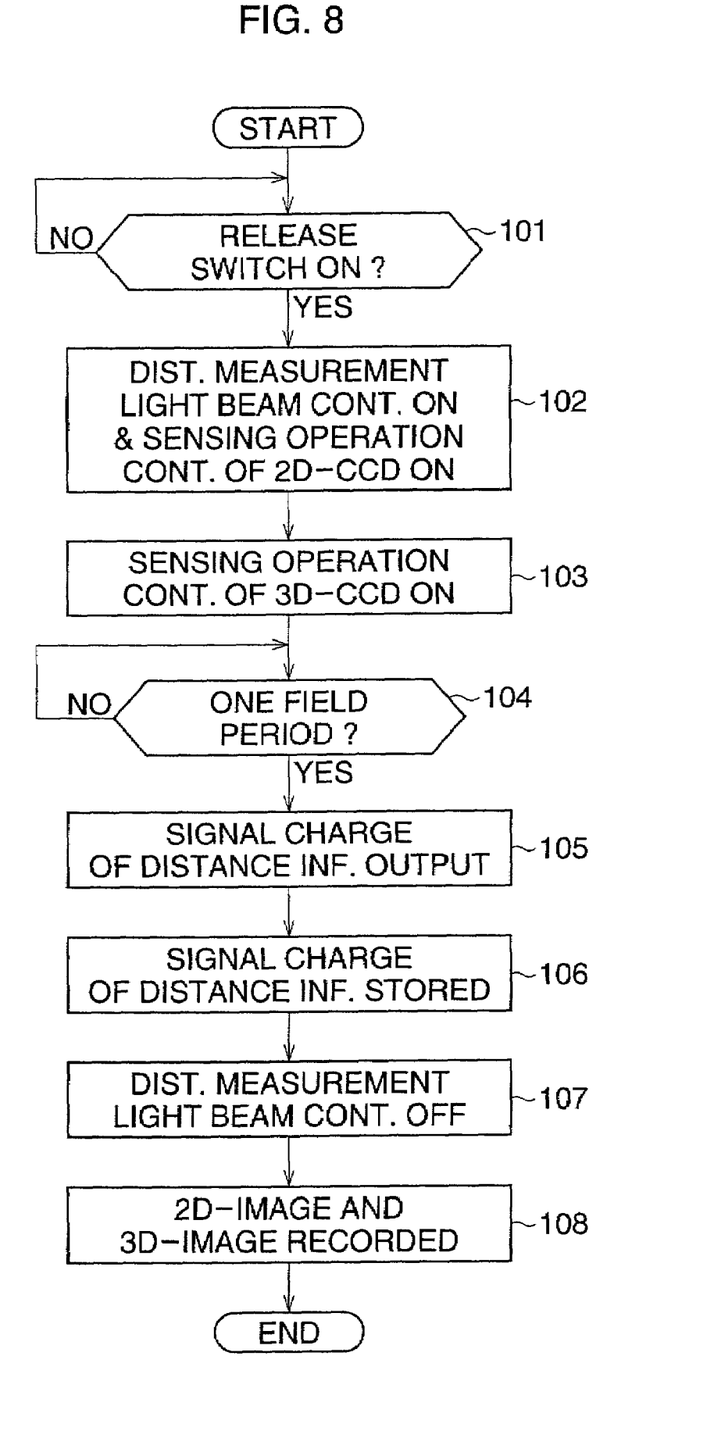
FIG. 8 shows a flowchart of the distance-information sensing operation.

FIG. 7 illustrates a timing chart of the distance-information sensing operation of the present embodiment, which integrates signal charges in the vertical transfer unit 52. Further, FIG. 8 is a flow chart of the distance-information sensing operation. With reference to FIG. 1, FIG. 2, and FIG. 5 through FIG. 8, the distance-information sensing operation with the three-dimensional image-capturing CCD 28' in the present embodiment is explained.

As it is shown in FIG. 7, in synchronization with an output of a vertical synchronizing signal S1, a pulse modulated measurement light beam S3 with a constant pulse width $T_s$ is output. At a predetermined time after the output of the measurement light beam S3, an electric charge discharging signal (a pulse signal) S2 is output, so that unwanted charge, which is accumulated in the photodiodes 51, is discharged to the substrate 53. Approximately simultaneously with a completion of the output of the measurement light beam S3, the output of the electric charge discharging signal S3 completes. Further, with the completion of the electric charge discharging signal S3, the electric charge accumulation in the photodiode 51 starts. Namely, the electric charge accumulation operation in the photodiode 51 is actuated approximately in synchronization with the fall of the measurement light beam S3. On the other hand, the measurement light beam S3, which is output in synchronization with the output of the vertical synchronizing signal S1, is reflected at the subject and then received at the three-dimensional image-capturing CCD 28' as a reflected light beam S4 after a time interval δ·t. When a predetermined time has elapsed since the output of the distance measuring light beam S3, i.e., a predetermined time after the start of the electric charge accumulation period, an electric charge transfer signal (pulse signal) S5 is output, so that the electric charge accumulated in the photo-diodes 51 is transferred to the vertical transfer unit 52 and the electric charge accumulation operation in the photodiode 51 is terminated. Note that the electric charge transfer signal S5 is output at a time after the output of the electric charge discharging signal S2, so that the fall of the reflected light beam is detected within the electric charge accumulation period T.

As described above, an electric charge corresponding to the distance from the camera to the subject is accumulated in the photodiode 51 during the period T, which is from the completion of the electric charge discharging signal S2 to the beginning of the electric charge transfer signal S5 output. Namely, the phase of the reflected light beam S4 is delayed δ·t from that of the measurement light beam S3 in accordance with the distance from the camera to the subject. Therefore, the reflected light beam S4 is received on the three-dimensional image-capturing CCD 28' at δ·t after the output of the measurement light beam S3 and only a part of the reflected light beam S4 is detected at the photodiode 51. The amount of light detected at the photodiode 51 relates to the time interval (δ·t), which is the time required for the light to travel the entire distance, so that an electric signal S6 generated by the detected reflected light corresponds to the distance of the subject. The electric signal S6 is transferred to the vertical transfer unit 52 when the electric charge transfer signal S5 is output. Note that, the synchronization of the start of the electric charge accumulation period T with the fall of the measurement light beam is not necessary. Timing between the measurement light beam and the electric charge accumulation period is adjusted by considering the range of a subject.

At a predetermined time after the output of the electric charge transfer signal S5, the electric charge discharging signal S2 is again output, so that unwanted charge, which is accumulated in the photo-diodes 51, is discharged to the substrate 53. Namely, a signal charge accumulation is again started in the photodiode 51. Similarly, when the electric charge accumulation period T elapses, a signal charge is transferred to the vertical transfer unit 52.

The transferring operation of the signal charge S6 to the vertical transfer unit 52 is repeatedly performed until the next vertical synchronizing signal S1 is output. Thus, the signal charge S6 is integrated in the vertical transfer unit 52. The signal charge S6 integrated for one field period, which is between two vertical synchronizing signals S1, corresponds to the distance information of the measurement subject, on the condition that the measurement subject is stationary for the period between the two vertical synchronizing signals S1. Note that, the above integrating operation of signal charges is not restricted to the one field integration. The period for the integration can be a multiple of a field period, for example.

The detecting operation of the signal charge S6 described above is carried out in all of the photo-diodes 51 provided in the CCD 28. As a result of the detecting operation for one field period, the distance information sensed by the photodiodes 51 is held in each corresponding vertical transfer unit 52, which is located adjacent to each column of photodiodes 51. The distance information is output from the CCD 28 by a vertical transferring operation of the vertical transfer units 52 and a horizontal transferring operation of a horizontal transfer units (not shown). The distance information is output from the three-dimensional image-capturing CCD 28' by a vertical transfer operation of the vertical transfer units 52 and a horizontal transfer operation of the horizontal transfer units.

Next, with reference to FIG. 8, the image-capturing operation carried out in the three-dimensional image-capturing device of the present embodiment will be explained. FIG. 8 is a flowchart of the image-capturing operation. The distance-information sensing operation is carried out in accordance with the flowchart of FIG. 8 with the two-dimensional image-capturing operation carried out for capturing a two-dimensional image or a still video image.

When it is recognized in Step 101 that the release switch 15 is fully depressed, Step 102 is executed. In Step 102, the normal still video control of the two-dimensional image-capturing CCD 28 is turned ON, so that a color still video image of the measurement subject is captured. At the same time, the vertical synchronizing signal S1 is output to the three-dimensional image-capturing CCD 28' and distance measuring light beam control is started. Namely, in parallel with the capturing operation of the still video image of the visible rays, which is executed in the two-dimensional image-capturing CCD 28, the light-emitting device 14 is actuated so that pulsed modulated distance measuring light beams S3 are intermittently output. The still video image or two-dimensional image captured by the two-dimensional image-capturing CCD 28 is temporally stored in the image memory 34 via the image-signal processing circuit 33. Then, Step 103 is executed so that a sensing operation control of the three-dimensional image-capturing CCD 28 is started. Namely, the distance-information sensing operation described with reference to FIG. 7 is started and the electric charge discharging signal S2 and the electric charge transfer signal S5 are alternately output, so that the electric charge S6 corresponding to the distance information is integrated in the vertical transfer units 52.

In Step 104, it is determined whether one field period has elapsed since the beginning of the distance-information sensing operation, i.e., whether a new vertical synchronizing signal S1 has been output. When one field period has passed, the process goes to Step 105 in which the signal charges S6 of the distance information are output from the three-dimensional image-capturing CCD 28'. Signals relating to the signal charges S6 are then temporally stored in the image memory 34 in Step 106. Then, in Step 107, the distance-measurement light beam control is turned OFF, and thus the light emitting operation of the light-emitting device 14 is stopped. Afterward, the image data of the two-dimensional and three-dimensional images, which are temporally stored in the image memory 34, are recorded in the recording medium M in Step 108, and then this image-capturing operation ends.

As described above, according to the present embodiment, a two-dimensional image, which may be a color still image of a subject, and a three-dimensional image, for which the pixel value corresponds to the distance of the subject, are captured simultaneously. However, a two-dimensional image is produced of the visible rays, while a three-dimensional image is produced of infrared rays. Therefore, the spectrums of rays detected on the two-dimensional image-capturing CCD 28 and three-dimensional image-capturing CCD 28' are different, so that lighting conditions for each two-dimensional and three-dimensional images are different even when the two-dimensional and three-dimensional images are taken under the same lightning. Namely, when a two-dimensional image and a three-dimensional image are captured simultaneously by a single photographing lens with a conventional diaphragm, the exposure condition on each two-dimensional image-capturing CCD 28 and three-dimensional image-capturing CCD 28' becomes different. Consequently, when an aperture is adjusted to the required exposure for one of the two-dimensional or three-dimensional images, exposure for the other image is generally inappropriate. Therefore, in general, it is impossible to get proper exposures for the both two-dimensional image and three-dimensional image simultaneously by using a single photographing optical system with a conventional diaphragm.

Figure 9:
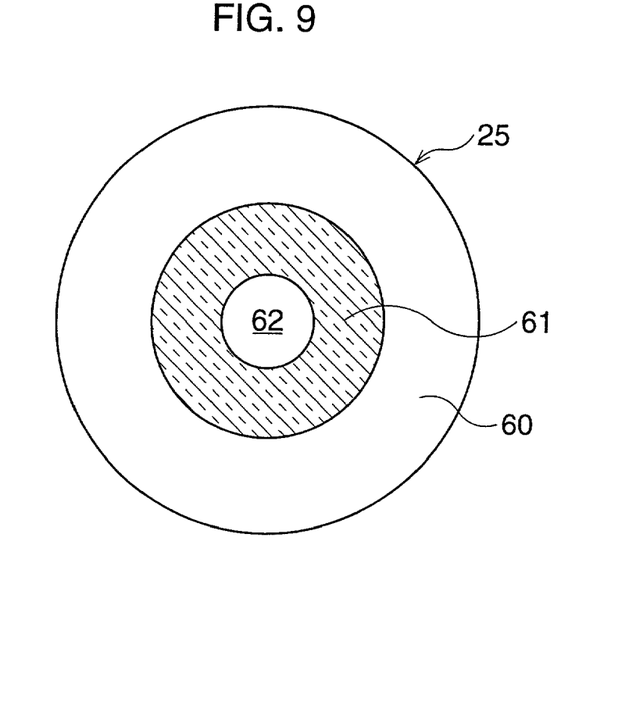
FIG. 9 schematically illustrates a plane view of the diaphragm of the first embodiment.
Figure 10:
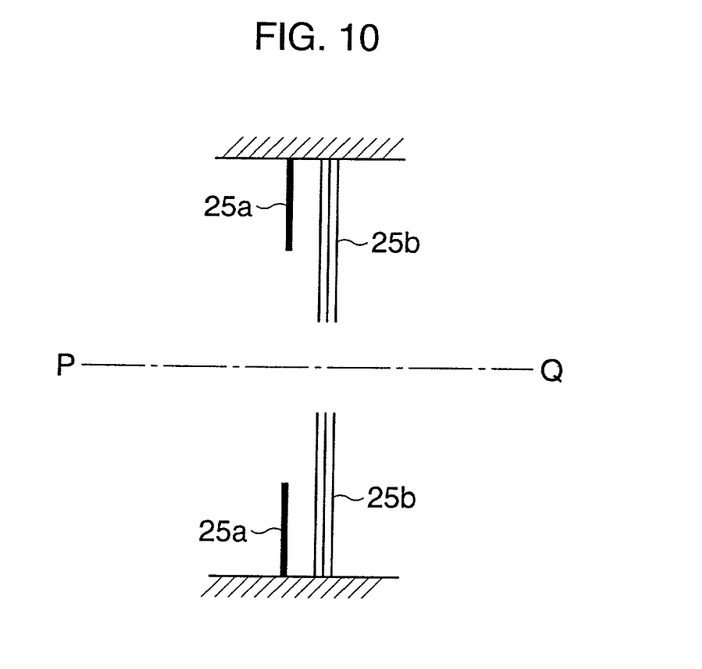
FIG. 10 schematically illustrates a sectional view of the diaphragm shown in FIG. 9.
Figure 11:
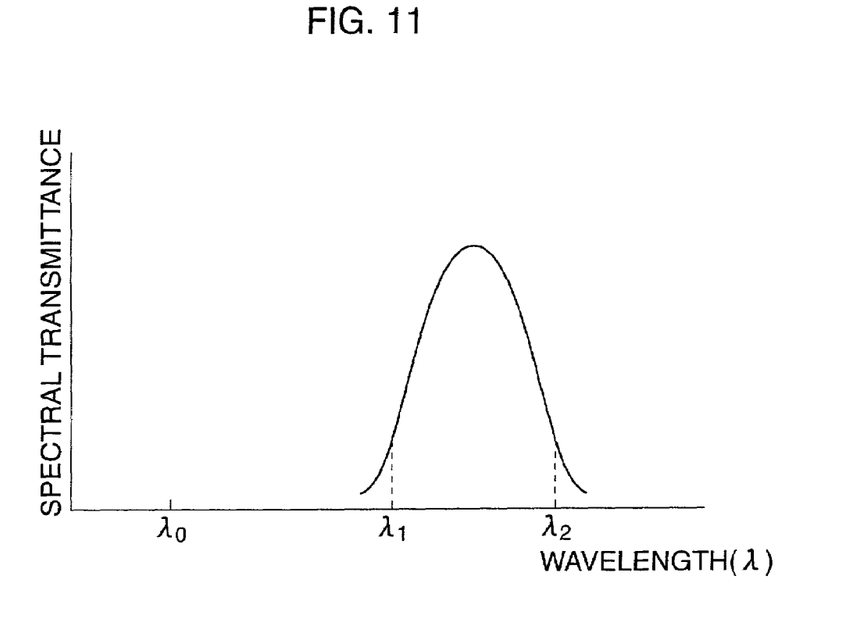
FIG. 11 shows an example of the spectral transmittance characteristics of the infrared cut-off filter utilized for the blade pieces of the diaphragm.

With reference to FIG. 9 through FIG. 11, the construction of the diaphragm 25 (refer FIG. 2) of the present embodiment will be described.

FIG. 9 schematically illustrates a plan view of the diaphragm 25 and FIG. 10 schematically illustrates a cross sectional view of the diaphragm 25 illustrated in FIG. 9. The plan view of the diaphragm 25 in FIG. 9 is viewed in the direction from P to Q of FIG. 10. The segment PQ corresponds to the optical axis of the photographing optical system or photographing lens system and incident light travels from P to Q. The fixed stops 25a and the iris stop 25b are arranged to be parallel in planes perpendicular to the optical axis PQ with a predetermined interval between the stops 25a and 25b along the optical axis PQ. The ring area 60 corresponds to the fixed stop 25a. A ring area (second area) 61 with the slanting lines corresponds to a part of the iris stop 25b. Namely, the area 61 indicates a part of the iris stop 25b viewed through the fixed stop 25a. The area 61 extends from the inner periphery of the fixed stop 25a. A center circular area (first area) 62 is an aperture created by the iris stop 25b.

The fixed stop 25a is formed out of opaque material that entirely shields the light. On the other hand, blade pieces that form a variable-opening of the iris or aperture 25b are formed out of an infrared filter which selectively transmits the infrared rays (for example, from about 770 nm to about 950 nm), which are radiated from the light-emitting device 14, and shields the visible rays (for example, from about 380 nm to about 770 nm).

The material for the infrared filter can be acrylic resin, for example. Note that, FIG. 11 shows an example of spectral transmittance characteristics of the infrared filter. The abscissa of FIG. 11 represents a wavelength of light and the ordinate represents transmittance of a band transmission filter. In the present embodiment, the wavelengths $\lambda_0$, $\lambda_1$, and $\lambda_2$ are 380 nm, 770 nm, and 950 nm, respectively.

As described above, according to the first embodiment, for the infrared rays of the incident light, the aperture 25a controls the amount of rays reaching the three-dimensional image-capturing CCD 28', and for the visible rays of the incident light, the aperture 25b controls the amount of rays reaching the two-dimensional image-capturing CCD 28 (note that, in this embodiment, the aperture 25a corresponds to a fully open aperture for the visible rays). Namely, with the construction of the present embodiment, although a two-dimensional image of the visible rays and a three-dimensional image of the infrared rays are captured simultaneously through a single photographing lens system, stop numbers for the visible rays and the infrared rays can be set individually so that both exposure for the two-dimensional image-capturing CCD and exposure for the three-dimensional image-capturing CCD can be set appropriately and simultaneously. Accordingly, images formed out of distinct spectrums are captured simultaneously through a single photographing optical system at appropriate exposure.

Figure 12:
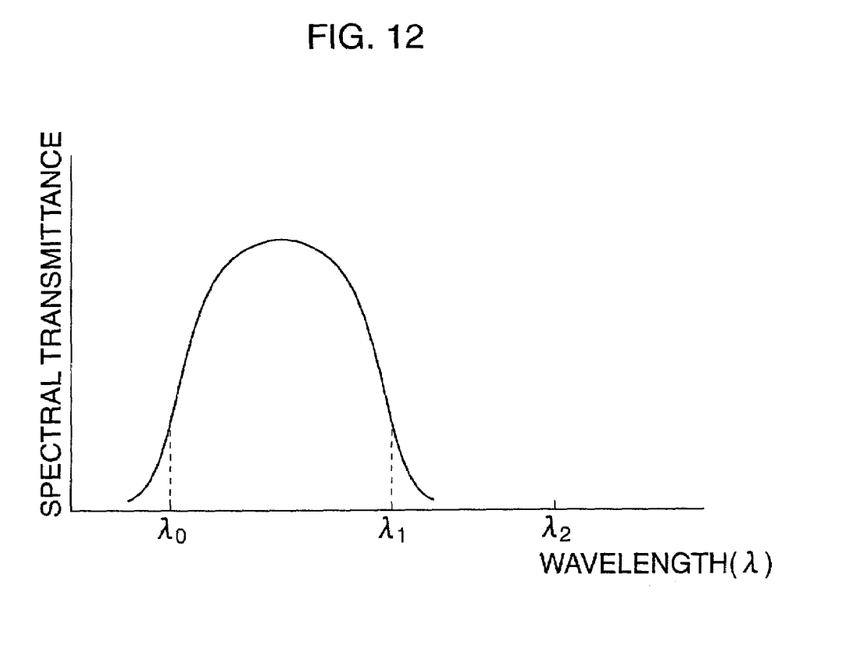
FIG. 12 shows an example of the spectral transmittance characteristics of the infrared filter utilized for the blade pieces of the diaphragm.

Note that, in the first embodiment, the blade pieces of the iris stop 25b are made of an infrared filter which selectively transmits the infrared rays and shields the visible rays. However, an infrared cut-off filter which transmits the visible rays selectively and shields the infrared rays can be applied to the blade pieces of the iris stop 25b in place of the infrared filter. With this construction, the aperture 25a functions as a stop for the visible rays of incident light and the aperture 25b functions as a stop for the infrared rays of incident light (note that, the aperture 25a corresponds to a fully open aperture for the infrared rays). An example of spectral transmittance characteristics of the infrared cut-off filter are shown in FIG. 12.

Note that, in the first embodiment, although the fixed stop and the iris stop are arranged in this order along the optical axis from the side which the light made incident (direction from P to Q), the order may be altered to the opposite order; i.e. the iris stop first and then the fixed stop. Further, the fixed stop in the first embodiment is made of opaque material, however, the stop can be formed out of an infrared cut-off filter.

Figure 13:
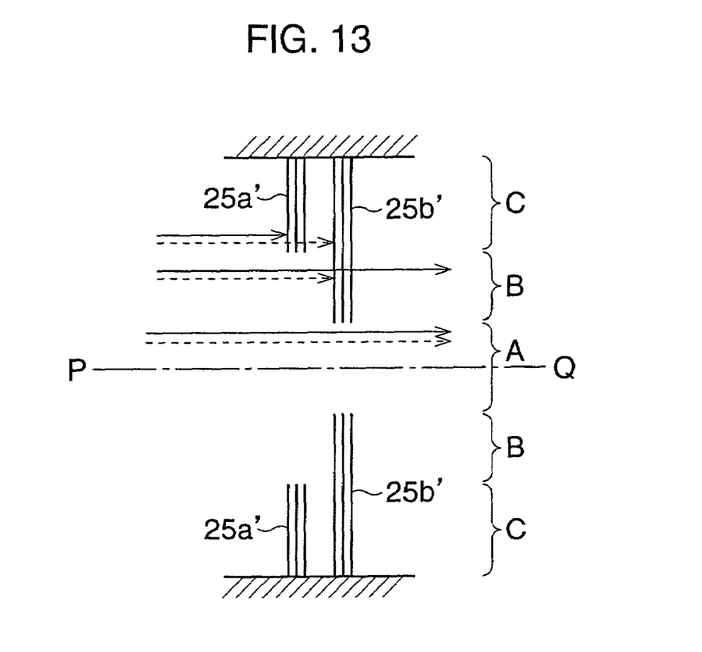
FIG. 13 schematically illustrates a sectional view of the diaphragm of the second embodiment.
Figure 14:
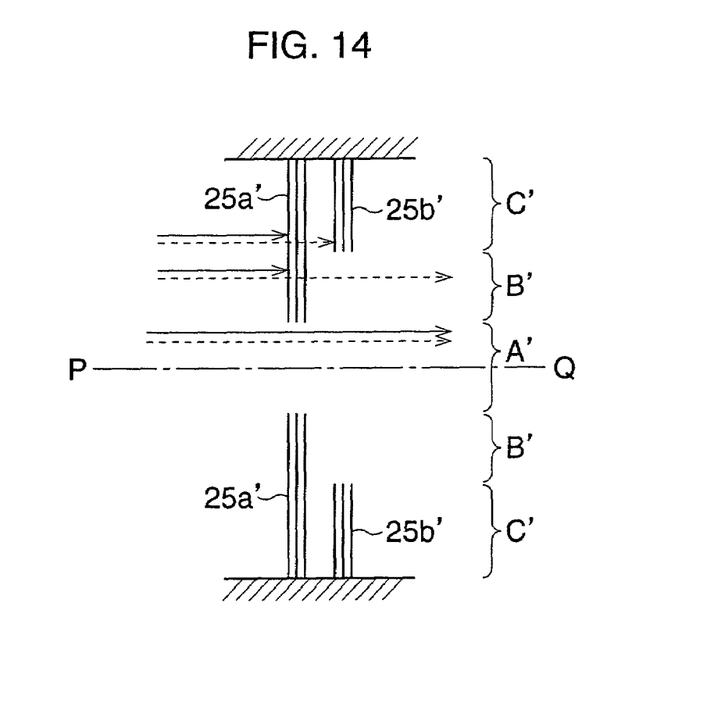
FIG. 14 schematically illustrates a sectional view of the diaphragm of the second embodiment.

With reference to FIG. 13 and FIG. 14, the second embodiment of the present invention will be explained. The structure of the second embodiment is similar to that of the first embodiment, so that only structure dissimilar to the first embodiment will be explained in the following.

FIG. 13 and FIG. 14 are the sectional views of a diaphragm 25' of the second embodiment, which corresponds to FIG. 10 of the first embodiment. The diaphragm 25' has two aperture stops, the iris stops 25a' and 25b'. Blade pieces of the iris stop 25a', for example, are made of an infrared filter which transmits the infrared rays (for example, from about 770 nm to about 950 nm) selectively and shields the visible rays (for example, from about 380 nm to about 770 nm). On the other hand, blade pieces of the iris stop 25b', for example, are made of an infrared cut-off filter which transmits the visible rays selectively and shields the infrared rays. FIG. 13 illustrates a state when the opening of the iris stop 25a' is set larger than that of the iris stop 25b' and FIG. 14 illustrates a state when the opening of the iris stop 25b' is set larger than that of the iris stop 25a'. FIG. 11 and FIG. 12 represent an example of the spectral transmittance characteristics of the infrared filter and the infrared cut-off filter. Further, in FIG. 13 and FIG. 14, an arrow represented by a solid line indicates a visible ray and an arrow represented by a broken line indicates an infrared ray.

In FIG. 13, an area (first area) A corresponds to an interior region of an opening formed by either the iris stop 25a' or the iris stop 25b', depending on which has the smaller diameter, so that both visible rays and infrared rays made incident to the photographing optical system can be transmitted to the area A of the diaphragm 25'. As for the area (second area) B of FIG. 13, since the blade pieces of the iris stop 25b' are made of an infrared cut-off filter, only visible rays can be transmitted to the area B of the diaphragm 25'. Further, since the visible rays are blocked off by the blade pieces of the iris stop 25a', only the infrared rays can be transmitted to an area C of the iris stop 25a' and reach the iris stop 25b'. However, the infrared rays are blocked off by the blade pieces of the iris stop 25b'. Therefore, both visible rays and infrared rays cannot be transmitted to the area C of the diaphragm 25'. As described above, an opening formed by the iris stop 25a' (which corresponds to the areas A and B of FIG. 13) functions as the aperture for the visible rays, and an opening formed by the iris stop 25b' (which corresponds to the area A of FIG. 13) functions as the aperture for the infrared rays.

Similar to the area A of FIG. 13, both visible and infrared rays can be transmitted to an area (first area) A' of FIG. 14. Only the infrared rays can be transmitted to an area (second area) B', since the visible rays are blocked off by the iris stop 25a'. Further, in an area C', the visible rays are blocked off by the iris stop 25a' and the infrared rays are blocked off by the iris stop 25b'. Namely, neither of the visible rays nor the infrared rays is transmitted to the area C' of the diaphragm 25' or the area C of FIG. 13. Accordingly, an opening formed by the iris stop 25a' (which corresponds to the areas A' of FIG. 14) functions as the aperture for the visible rays, and an opening formed by the iris stop 25b' (which corresponds to the areas A' and B' of FIG. 14) functions as the aperture for the infrared rays.

As described above, according to the second embodiment of the present invention, a similar effect as that in the first embodiment can be obtained. Further, in the second embodiment, the aperture stops 25a' and 25b' are both iris stops, so that precise exposure adjustment can be carried out for each image produced by the respective spectrums.

In the present embodiments, an iris stop is used as an example of a variable diameter diaphragm, any other type of diaphragm is acceptable. Further, opaque material may be used for the blade pieces of one of the iris stops in the second embodiment.

Note that, optical filters which selectively transmit visible rays (an infrared cut-off filter) and which selectively transmit infrared rays (an infrared filter) are utilized for the diaphragm 25. However, spectrums are not restricted to the visible or infrared spectrums. Namely, when a color image is not required for a two-dimensional image, other spectrum may be selected for a band transmission filter. Further, the infrared rays are not necessary for three-dimensional image-capturing, so that other spectrum may be chosen for a measurement light beam so long as the corresponding band transmission filter is used in the diaphragm.

In the present embodiments, a dichroic mirror, which reflects infrared rays and transmits other rays, is applied with an infrared cut-off filter for the two-dimensional image-capturing CCD and a visible rays cut-off filter or infrared filter for the three-dimensional image-capturing CCD. However, the dichroic mirror can be displaced by a half-mirror, or the infrared cut-off filter and infrared filter may be excluded when a dichroic mirror is used.

In the present embodiments, a three-dimensional image-capturing device (which captures a two-dimensional image and a three-dimensional image simultaneously in a single optical system) is an example of how a diaphragm of an embodiment of the present invention can be used. However, the diaphragms of the present embodiments, for example, can be applied to an image-capturing device that simultaneously captures any other type of visible or invisible images, such as monochrome, color, infrared, ultraviolet images, and so on, which has no relation to a distance of a subject.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2001-173878 (filed on Jun. 8, 2001) which is expressly incorporated herein, by reference, in its entirety.

The invention claimed is:

1. An image-capturing device, comprising:
   a photographing optical system that is used to form subject images;
   a first imaging device that receives light rays of a first spectrum through said photographing optical system and captures one of said subject images formed by said light rays of said first spectrum;
   a second imaging device that receives light rays of a second spectrum through said photographing optical system and captures one of said subject images formed by said light rays of said second spectrum;
   a diaphragm that is mounted in said photographing optical system, and that forms a first area and a second area;
   a light source that radiates measurement light beams of said first spectrum to a subject at a predetermined timing; and
   a distance information sensing processor that drives said first imaging device in association with the measurement light beams radiated from said light source, so that a pixel value of an image sensed by said first imaging device relates to a distance between a pixel of said first imaging device and a corresponding point on the subject;

wherein said first area transmits light rays of said first spectrum and said second spectrum, and said second area selectively transmits light rays of one of said first spectrum and said second spectrum.

2. A device according to claim 1, wherein said diaphragm comprises:

a first aperture stop of which an opening corresponds to said first area; and a second aperture stop of which an opening corresponds to an area that includes said second area;

wherein said second area surrounds said first area.

3. A device according to claim 2, wherein said first aperture stop comprises a material which selectively transmits light rays of one of said first spectrum and said second spectrum.

4. A device according to claim 2, wherein said second aperture stop comprises a material which shields light rays of said first and second spectrums.

5. A device according to claim 2, wherein the opening of said first aperture stop is variable.

6. A device according to claim 2, wherein the opening of said second aperture stop is fixed.

7. A device according to claim 2, wherein said first and second aperture stops are arranged in parallel, and both said first and second aperture stops are arranged in planes perpendicular to the optical axis of said photographing optical system.

8. A device according to claim 2, wherein said first aperture stop comprises a material which shields light rays of one of said first spectrum and said second spectrum;

wherein said second aperture stop comprises a material which shields light rays of a spectrum of the other of said first and second spectrums; and wherein the opening of said first aperture stop and the opening of said second stop are variable.

9. A device according to claim 8, wherein said first and second aperture stops comprise an iris stop.

10. A device according to claim 1, wherein said second area transmits light rays of said first spectrum.

11. A device according to claim 1, wherein said first spectrum comprises an infrared light spectrum and said second spectrum comprises a visible light spectrum.

12. A device according to claim 1, wherein said first imaging device is mounted with an optical filter that selectively transmits light rays of said first spectrum.

13. A device according to claim 1, wherein said second imaging device is mounted with an optical filter that selectively transmits light rays of said second spectrum.

14. A device according to claim 1, further comprising:

a dichroic mirror that separates light rays of said first spectrum and of said second spectrum incident to said photographing optical system, wherein the light rays of each of said first spectrum and said second spectrum are led to said first and second imaging devices, respectively.

* * * * *